United States Patent [19]

Honda

[11] 4,262,552
[45] Apr. 21, 1981

[54] FLYWHEEL ASSEMBLY FOR AN INTERNAL COMBUSTION ENGINE

[75] Inventor: Shoichi Honda, Tokyo, Japan

[73] Assignee: Honda Giken Kogyo Kabushiki Kaisha, Tokyo, Japan

[21] Appl. No.: 92,500

[22] Filed: Nov. 8, 1979

Related U.S. Application Data

[63] Continuation-in-part of Ser. No. 839,123, Oct. 3, 1977, abandoned.

[30] Foreign Application Priority Data

Oct. 8, 1976 [JP] Japan .............................. 51-136216

[51] Int. Cl.$^3$ .............................................. G05G 1/00
[52] U.S. Cl. ................................ 74/572; 192/103 F; 192/104 B; 192/105 A
[58] Field of Search ........................ 74/572, 573 F; 192/104 B, 104 F, 103 F, 105 A; 123/179 CC

[56] References Cited

U.S. PATENT DOCUMENTS

| | | | |
|---|---|---|---|
| 664,026 | 12/1900 | Nash | 192/104 B |
| 756,363 | 4/1904 | Helfers | 192/104 B |
| 1,106,156 | 8/1914 | Ogg | 192/104 B |
| 1,689,913 | 10/1928 | Carrey | 74/572 |
| 1,858,583 | 5/1932 | Fahrney | 123/179 CC |
| 1,962,962 | 6/1934 | Linder | 123/179 CC |
| 2,266,865 | 12/1941 | Herrington | 123/179 CC |
| 2,278,547 | 4/1942 | Herrington | 123/179 CC |
| 2,398,087 | 4/1946 | Dodge | 192/104 B |
| 2,643,750 | 6/1953 | Moulton | 123/179 CC |
| 2,717,821 | 9/1955 | Perry, Jr. | 192/104 B X |
| 2,771,792 | 11/1956 | Whitney | 192/104 B X |
| 3,275,115 | 9/1966 | Timberlake et al. | 192/104 B X |

*Primary Examiner*—Kenneth Dorner
*Attorney, Agent, or Firm*—Haseltine and Lake

[57] ABSTRACT

A flywheel assembly for an internal combustion engine including a first flywheel fixed to the engine crankshaft, a second flywheel rotatably mounted on the crankshaft, and a centrifugal clutch arranged between the second flywheel and the engine crankshaft. In a low speed region of engine operation including idling, the second flywheel is held connected to the crankshaft by means of the centrifugal type clutch, adding to the inertial mass thereof. In a high speed engine operation, the second flywheel is disconnected from the crankshaft to materially reduce the inertial mass of the crankshaft and thus enhance the engine acceleration. The flywheel assembly further includes a hydraulic control means for hydraulically connecting the first and second flywheels during disengagement of the centrifugal type clutch so as to ensure sliding and smooth connection or disconnection between the first and second flywheels.

4 Claims, 3 Drawing Figures

4,262,552

FLYWHEEL ASSEMBLY FOR AN INTERNAL COMBUSTION ENGINE

CROSS-RELATED APPLICATION

This application is a continuation-in-part of the copending application Ser. No. 839,123 filed Oct. 3, 1977, now abandoned, and claims the priority of the application filed in Japan Oct. 8, 1976.

BACKGROUND OF THE INVENTION

FIELD OF THE INVENTION

This invention relates to flywheel assemblies for internal combustion engines and more particularly to those of the type designed to control the inertial mass of the engine crankshaft assembly.

DESCRIPTION OF THE INVENTION

The rotation of an engine crankshaft is apt to be unstabilized or fluctuated particularly in a low speed region of engine rotation including idling. Thus, it is desirable for the flywheel to give an increased inertial mass to the crankshaft in order to provide a smooth rotation of the crankshaft, even in a low speed region of operation as described. However, in a high speed region of engine operation where the crankshaft may rotate in a stabilized manner, it is not necessary to give an increased inertial mass as mentioned above to the flywheel, since a large inertial mass gives rise to difficulties where acceleration of the engine is imparted or a great shock in speed change occurs when the clutch is engaged for connection between the engine crankshaft and the power transmission system. For this reason, it involves a problem in setting an inertial mass of the flywheel to an increased value. In the past, therefore, the inertial mass of the flywheel is increased as much as possible within the allowable range, so as not to produce the aforementioned problem. However, this has absolutely failed to completely satisfy two technical factors which are contrary to each other, one in which fluctuations in rotation of the crankshaft are effectively restrained in a low speed region of engine operation, and the other in which the acceleration of the engine is not at all reduced in a high speed region of engine rotation.

SUMMARY OF THE INVENTION

In view of the above, the present invention is primarily intended to provide a novel arrangement which can meet the above described two requirements.

To this end, it is proposed according to the invention that in a low speed region of engine operation, an increased inertial mass is given to the engine crankshaft to reduce fluctuations in rotation thereof while, in a higher speed region exceeding a predetermined speed of rotation, the engine crankshaft is given a reduced inertial mass to enhance the acceleration performance of the engine.

According to the present invention, there is provided a flywheel assembly for an internal combustion engine which comprises: a first flywheel having a boss portion fixedly mounted on said crankshaft, a second flywheel rotatably mounted on said boss portion of said first flywheel through a bearing, said second flywheel having an annular recess formed therein at a location adjacent said first flywheel, a centrifugal type clutch housed in said recess of said second flywheel and being operable to interconnect said crankshaft and second flywheel when rotation speed of said engine is less than a predetermined level and adapted to disengage when engine rotation speed exceeds said predetermined level, said centrifugal type clutch including clutch shoes disposed in said recess, each being pivotally supported on said first flywheel, said clutch shoes each having a weighted portion and a friction engaging portion formed at the opposite ends thereof, being normally urged by spring means in a direction to hold said friction engaging portion in engagement with the inner peripheral wall surface of said recess.

If the second flywheel is brought into or out of engagement with the first flywheel instantaneously or rapidly, inertial mass of the crankshaft will be suddenly or discontinuously increased or decreased to give rise to a considerable shock or damage to the engine and also undesirable feel to the operator.

Accordingly, it is another object of the present invention to provide an improved flywheel assembly of the kind described which ensures smooth engagement and disengagement of the first and second flywheels to thereby avoid the above described inconveniences.

The above and other objects, features and advantages of the present invention will become apparent from the following description when taken in conjunction with the accompanying drawings.

DESCRIPTION OF THE PREFERRED EMBODIMENTS

Figure 1:
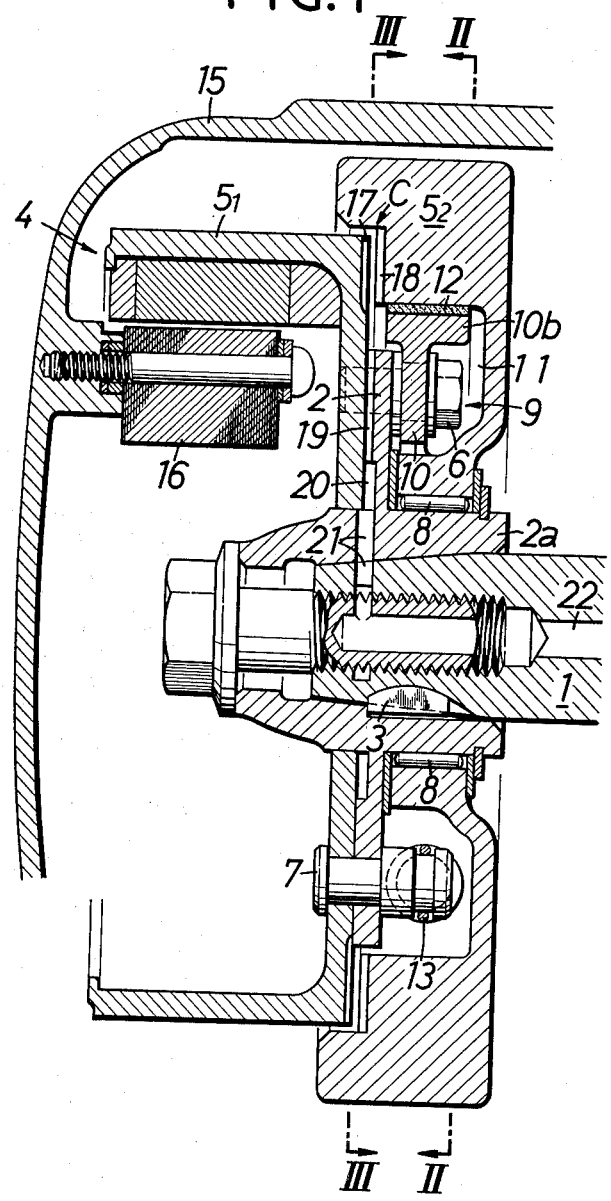
FIG. 1 is an axial cross-sectional view of one preferred form of flywheel assembly embodying the present invention.
Figure 2:
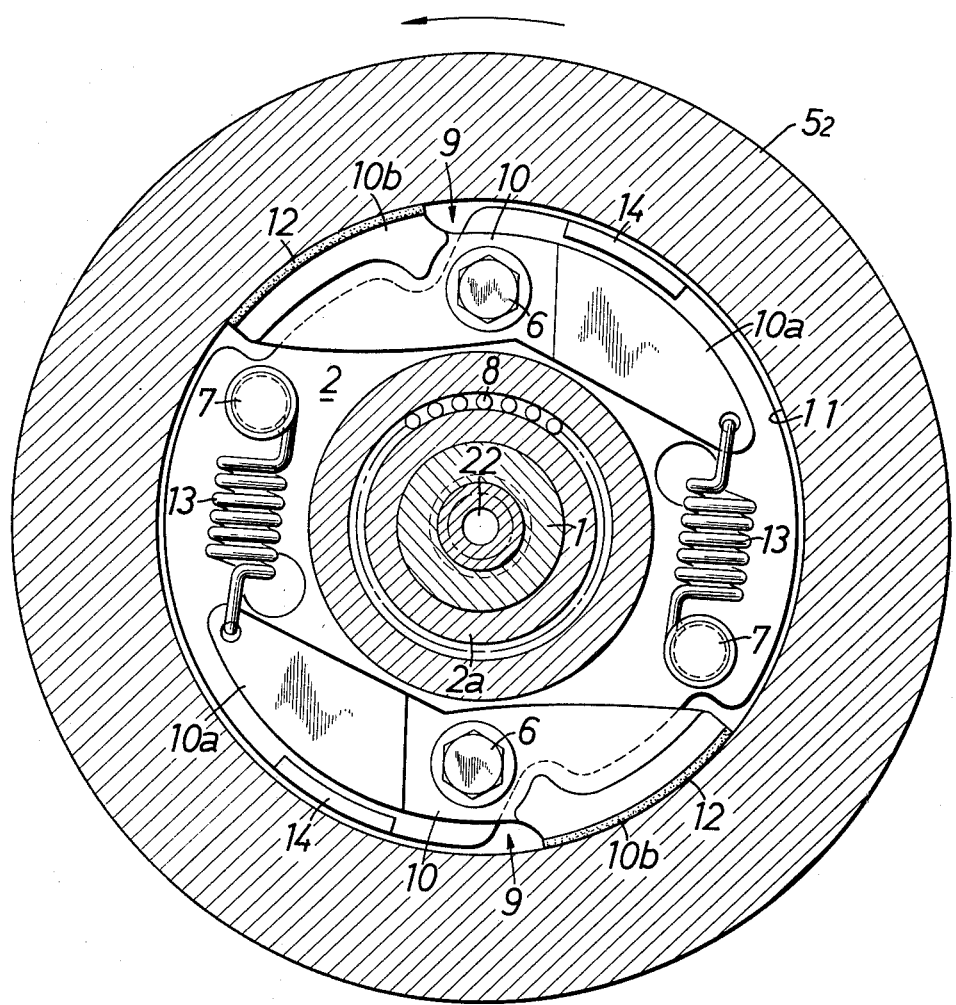
FIG. 2 is a cross section taken along the line II—II in FIG. 1.

Referring to the drawings, reference numeral 1 indicates the crankshaft of an engine and 2, a flywheel mounting disc firmly fixed to the crankshaft 1 at the illustrated end thereof by key means 3. Fixedly mounted on the mounting disc 2 is a first flywheel $5_1$ which takes the form of the rotor of a magneto 4. As illustrated, the first flywheel $5_1$ is secured to the mounting disc 2 by means of a pair of diametrally opposite fastening bolts 6 and a pair of diametrally opposite rivet pins 7. The flywheel mounting disc 2 includes a hub portion 2a on which a second flywheel $5_2$ is rotatably mounted through the medium of a needle bearing 8. Arranged between the second flywheel $5_2$ and the mounting disc 2 is a normally closed centrifugal type clutch 9 which controls the connection and disconnection therebetween and is constructed as described below.

Reference numeral 10 indicates a pair of clutch shoes which are pivotally mounted at the middle thereof on the respective fastening bolts 6 and accommodated in an annular clutch chamber 11 defined in the second flywheel $5_2$. The clutch shoes 10 each have a weighted portion 10a formed at one end thereof and a friction engaging portion 10b formed at the other end. The end surface of friction engaging portion 10b is covered with a friction lining 12 and is normally held in engagement with the inner peripheral wall surface of the clutch chamber 11, formed in the second flywheel $5_2$, under the urge of a clutch spring 13 extended between the weighted portion 10a and the associated one of rivet pins 7. Provided on the flywheel mounting disc 2 are a pair of diametrally opposite projections 14 each of which serves as stop means for limiting the extent of outward rocking movement of the weighted portion 10a of the clutch shoe 10.

Figure 3:
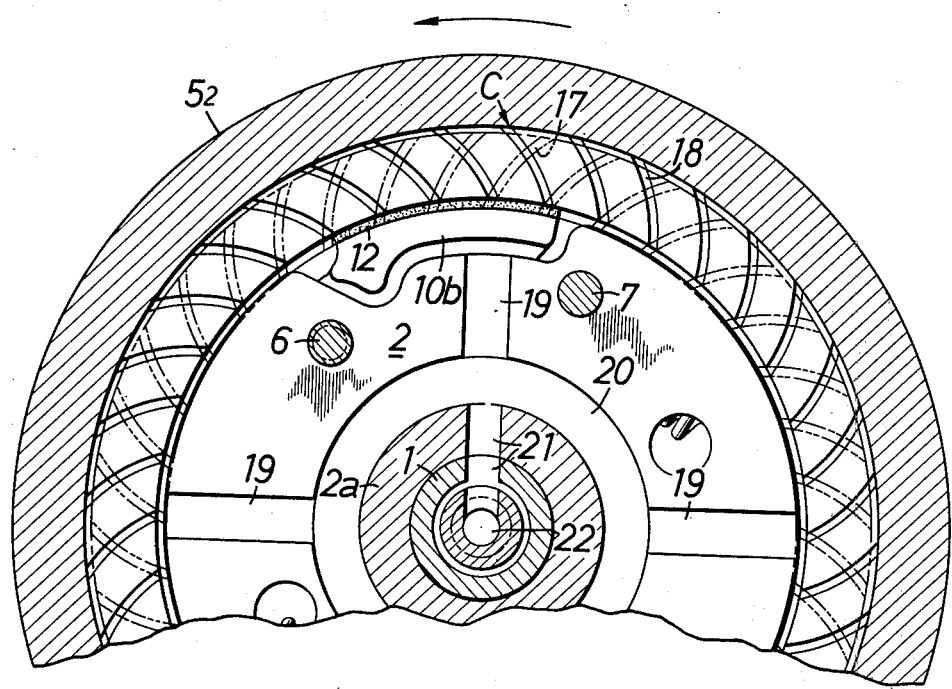
FIG. 3 is a cross section taken along the line III—III in FIG. 1.

Between the first and second flywheels $5_1$ and $5_2$ there is provided a hydraulic control means, generally indicated by reference C, for enabling smooth engagement and disengagement of the first and second flywheels $5_1$ and $5_2$ without giving rise to any substantial shocks. The hydraulic control means C includes a multitude of first and second radial grooves 17, 18 respectively formed in the adjacent side surfaces of the first and second flywheels $5_1$, $5_2$ near the outer peripheries thereof at circumferentially equal intervals, as clearly shown in FIG. 3. The grooves 17, 18 extend generally in the radial direction and curves in the circumferentially opposite directions. The grooves 17, 18 may take any appropriate configuration other than those as illustrated, and for example, they may be simple radial grooves which extend straight in radial directions.

The grooves 17, 18 are in communication with a source of hydraulic oil (not shown) by way of a plurality of radial passages 19 and an annular passage 20 formed in the flywheel mounting disc 2, a radial passage 21 extending radially through the hub portion 2a and the crankshaft 1, an axial passage 22 formed axially through the crankshaft 1.

In FIG. 1, reference numeral 15 indicates the engine cover and 16, the stator of magneto 4 secured thereto.

Description will now be made of the operation of the embodiment illustrated. In a low speed region of engine operation including engine idling, the tension preset in each of clutch springs 13 to normally urge the weighted portion 10a of the associated clutch shoe 10 remains to overcome any centrifugal force acting on the weighted portion 10a so as to hold the friction engaging portion 10b of clutch shoe 10 in friction engagement with the second flywheel $5_2$. In other words, the centrifugal clutch 9 is held in engagement to connect the second flywheel $5_2$ with the flywheel mounting disc 2 so that both first and second flywheels $5_1$ and $5_2$ contribute to the inertial mass of the engine crankshaft 1.

Subsequently, when the speed of rotation of the engine crankshaft 1 is raised to enter a region exceeding a predetermined RPM, the centrifugal force acting on the weighted portion 10a of each of clutch shoes 10 overcomes the preset tension of the associated clutch spring 13, thus causing the clutch shoe 10 to rock in a direction to move its friction engaging portion 10b apart from the second flywheel $5_2$. In this manner, the centrifugal clutch 9 is placed in a disengaged state, rendering the second flywheel $5_2$ free from the flywheel mounting plate 2 and hence from the engine crankshaft 1. As a consequence, the inertial mass of crankshaft 1 is reduced by an amount corresponding to that of the second flywheel $5_2$.

In the meanwhile, oil is fed to the grooves 17, 18 in the first and second flywheels $5_1$ and $5_2$ from a hydraulic oil source (not shown) by way of passages 22, 21, 20 and 19, and forced under centrifugal effect to flow through the multitude of grooves 17, 18 in the radially outward directions to thereby hydraulically connect the first and second flywheels $5_1$, $5_2$ under the combined action of the flow rate or water wheel effect and the viscosity of the oil, as a consequence of which even during rapid engine acceleration or deceleration, the second flywheel $5_2$ is being slidingly disconnected from or engaged with the first flywheel in a smooth manner upon actuation or deactuation of the centrifugal clutch 9 without causing any substantial shock.

It will be appreciated from the foregoing description that the flywheel assembly of the present invention, including a first and a second flywheel $5_1$, $5_2$ and a centrifugal clutch 9, advantageously serves, in a low speed region of engine operation including idling, effectively to smooth out the fluctuations in rotation of the engine crankshaft 1 and thus to minimize engine vibration with the inertial mass of the crankshaft increased with both first and second flywheels $5_1$ and $5_2$ secured thereto and also serves, in a high speed range of engine operation exceeding a predetermined RPM level, to minimize the inertial mass of the crankshaft 1 with the second flywheel $5_2$ automatically disconnected therefrom so that the engine acceleration is materially improved.

While one preferred embodiment of the present invention has been shown and described, it will be apparent to those skilled in the art that various changes and modifications may be made therein without departing from the spirit of the invention or the scope of the appended claims.

What is claimed is:

1. A flywheel assembly for an internal combustion engine having a crankshaft, comprising: a first flywheel having a boss portion fixedly mounted on said crankshaft, a second flywheel rotatably mounted on said boss portion of said first flywheel through a bearing, said second flywheel having an annular recess formed therein at a location adjacent said first flywheel, a centrifugal type clutch housed in said recess of said second flywheel and being operable to interconnect said crankshaft and second flywheel when rotation speed of said engine is less than a predetermined level and adapted to disengage when engine rotation speed exceeds said predetermined level, said centrifugal type clutch including clutch shoes disposed in said recess, each being pivotally supported on said first flywheel, said clutch shoes each having a weighted portion and a friction engaging portion formed at the opposite ends thereof, being normally urged by spring means in a direction to hold said friction engaging portion in engagement with an inner peripheral wall surface of said recess.

2. A flywheel assembly according to claim 1, comprising a hydraulic control means between said flywheels for hydraulically connecting said first and second flywheels during disengagement of said centrifugal type clutch.

3. A flywheel assembly according to claim 2, wherein said hydraulic control means comprises a plurality of first grooves formed in one side surface of said first flywheel and extending generally in radial directions, and a plurality of second grooves formed in a side surface of said second flywheel in confrontation with said first grooves and extending generally in radial directions, said first and second grooves being in fluid communication with a source of hydraulic oil so that oil is forced to flow through said first and second grooves thereby hydraulically connecting said first and second flywheels with each other.

4. A flywheel assembly according to claim 1, wherein said first flywheel is a rotor of a magneto.

* * * * *